(12) United States Patent
Altenbuchner

(10) Patent No.: US 7,387,065 B2
(45) Date of Patent: Jun. 17, 2008

(54) MOVABLE STUFFING MACHINE FOR THE PRODUCTION OF SILAGE STORED ON THE BOTTOM BY MEANS OF A TUBULAR FILM

(76) Inventor: Josef Altenbuchner, Duttendorf 12, A-5122 Hochburg-Ach (AT)

( * ) Notice: Subject to any disclaimer, the term of this patent is extended or adjusted under 35 U.S.C. 154(b) by 77 days.

(21) Appl. No.: 10/570,283
(22) PCT Filed: Aug. 27, 2004
(86) PCT No.: PCT/EP2004/009579
§ 371 (c)(1), (2), (4) Date: Feb. 27, 2006
(87) PCT Pub. No.: WO2005/020666
PCT Pub. Date: Mar. 10, 2005

(65) Prior Publication Data
US 2007/0127987 A1 Jun. 7, 2007

(30) Foreign Application Priority Data
Aug. 27, 2003 (DE) ................................. 103 39 751

(51) Int. Cl.
B65G 3/04 (2006.01)
B30B 3/00 (2006.01)
(52) U.S. Cl. .................. 100/65; 100/100; 100/98 R; 100/145; 241/101.2
(58) Field of Classification Search ............ 100/65, 100/66, 69, 94, 98 R, 145, 146, 147, 148, 100/150; 241/101.2
See application file for complete search history.

(56) References Cited
U.S. PATENT DOCUMENTS
4,310,036 A * 1/1982 Rasmussen et al. ........ 141/114
4,949,633 A * 8/1990 Johnson et al. .............. 100/65
5,974,776 A 11/1999 Prellwitz
6,516,586 B1 * 2/2003 Wingert ...................... 53/438

FOREIGN PATENT DOCUMENTS
| DE | 8806689 | 8/1988 |
|---|---|---|
| DE | 4022043 | 1/1992 |
| DE | 4012482 | 10/2001 |
| DE | 10048945 | 11/2002 |
| EP | 0659332 | 6/1995 |
| EP | 1210864 | 6/2002 |

* cited by examiner

Primary Examiner—Jimmy T Nguyen
(74) Attorney, Agent, or Firm—Horst M. Kasper

(57) ABSTRACT

A movable stuffing machine for producing silage is disclosed wherein the silage is stored on the bottom and is used for filling a tubular film. The stuffing machine comprises a stuffing wall (1) which is disposed perpendicular to the longitudinal direction of the stuffing machine and the direction of stuffing. A driven worm-type compactor is mounted on the stuffing wall (1), is aligned at a right angle from a longitudinal direction of the stuffing machine, is disposed in a horizontal direction, and is embodied as a pronged rotor (3) encompassing conveying prongs (9) which are offset in a helical manner. A feeding device (4) encompassing a metering mechanism (6) is placed upstream of said worm type compactor. The stuffing machine also comprises a roll (7) of silo film, which is mounted thereabove and from which the silo film (30) is directed to the guiding wall through at least one deflection roller (8).

19 Claims, 4 Drawing Sheets

Figure 1:
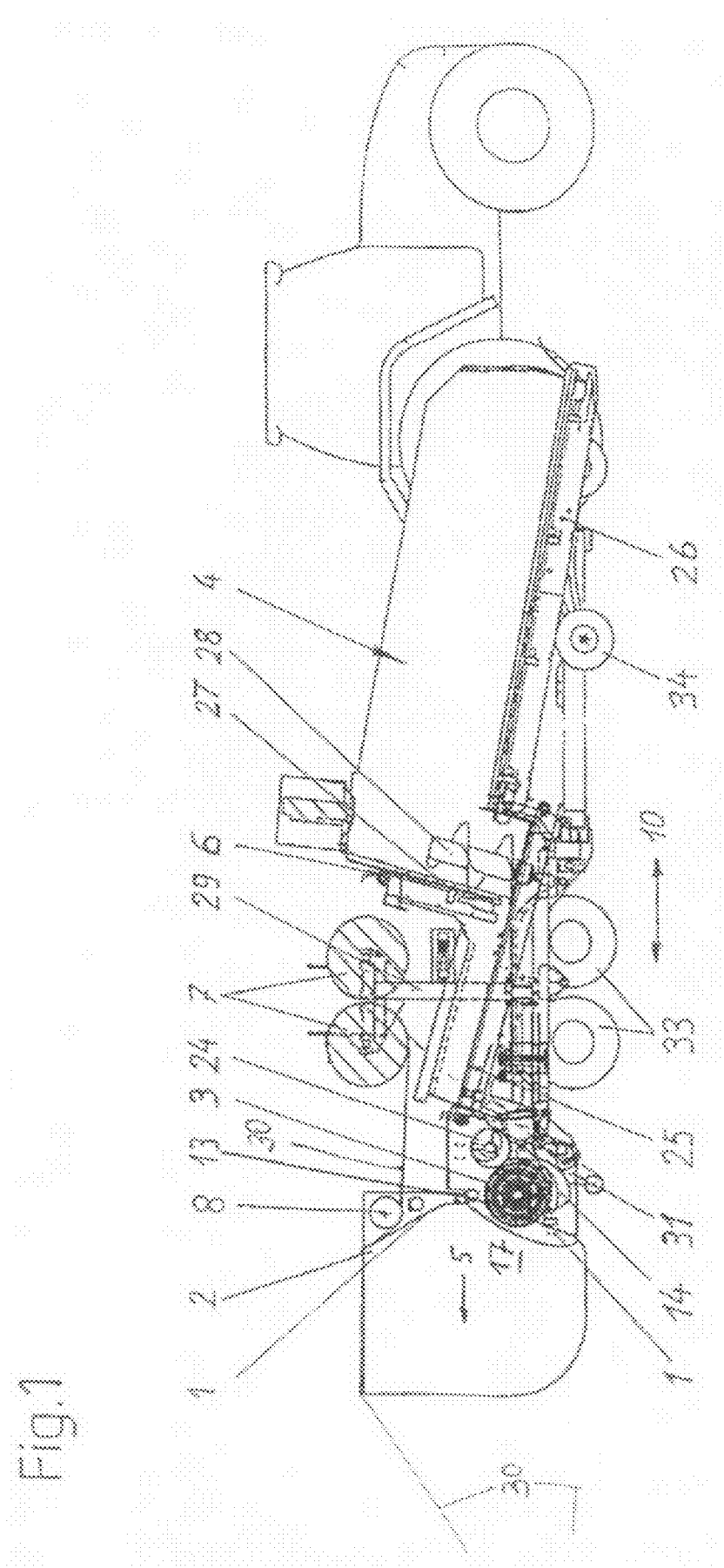

MOVABLE STUFFING MACHINE FOR THE PRODUCTION OF SILAGE STORED ON THE BOTTOM BY MEANS OF A TUBULAR FILM

CROSS-REFERENCE TO RELATED APPLICATIONS (not applicable)

STATEMENT REGARDING FEDERALLY SPONSORED RESEARCH OR DEVELOPMENT (not applicable)

THE NAMES OF THE PARTIES TO A JOINT RESEARCH AGREEMENT (not applicable)

INCORPORATION-BY-REFERENCE OF MATERIAL SUBMITTED ON A COMPACT DISC (not applicable)

BACKGROUND OF THE INVENTION (1) Field of the Invention

The Invention relates to a wheeled tamping machine for the production of silage stored on the floor, for filling of a foil tube.

(2) Description of Related Art Including Information Disclosed Under 37 CFR 1.97 and 1.98

Tamping machines are known, where the silage material is placed in the receiver storage and is transferred with a conveyor to a filling device. The filling device comprises a tamping wall, wherein the tamping wall is disposed perpendicular to the longitudinal direction of the tamping machine and to the tamping device and wherein a guide wall joins toward the top and the side to the tamping device, and wherein the foil tube slides over the guide wall during filling. The tamping wall is continued downwards and forwardly with a press jacket, wherein the press jacket forms the lower part of a press trough. A pronged rotor disposed at a right angle relative to the tamping direction and aligned with the longitudinal direction of the tamping machine is disposed horizontally at the press jacket and supported rotating from below to the top as a conveyor press, wherein the pronged rotor grips through the tamping wall into the tamping chamber and wherein cleaner strippers downwardly directed engage between the prongs of the rotor. A metering device is applied at a distance to the entrance point of the silage material and ahead of the entrance of the silage material into the region of the conveyor press. A roll of foil is supported above the tamping machine aligned at a right angle relative to the tamping direction, wherein the cut open foil above and downwardly on two sides is guided over the guide wall by the roll of foil.

BRIEF SUMMARY OF THE INVENTION

It is disadvantageous with this arrangement that the tamping power of the pronged rotor is nonuniform during the charging and the feed to the conveyor press based on too low a balancing effect and therewith leads to a nonuniform filling and densification and to a nonuniform withdrawal of the foil, whereby an insufficient fermentation results. The uniform feeding during folding open of the foil is impossible without guide wheels or with guide wheels of too small a width and adjustability and leads to high pull tensions and distortions of the foil and therewith to an insufficient closure of the foil in the floor region.

It is an object of the present Invention to eliminate or to avoid the described disadvantages in connection with a tamping machine and to furnish a tamping machine, which permits a quick, reliable and completely uniform tamping with high densification and compacting and small unbending even in case of difficult grass silage and which permits employment of cheap folded silage foil, wherein a joint arrangement of tamping machine and charging device is furnished as a wheeled unit, wherein the wheeled unit can be driven by a tractor.

This object is achieved with the tamping machine disclosed in the present application.

The specification is concerned with particularly advantageous embodiments of the Invention and these form simultaneously a part of the description of the Invention.

A pronged rotor is placed in a rotor trough, wherein the conveyor prongs of the pronged rotor grip through a tamping opening reaching over the width of the tamping wall and wherein the conveyor material is so strongly densified and compacted with the pronged rotor that only a small unbending occurs in the tamping chamber, wherein the densified and compacted conveyor material is moved from above by cleaner strippers from the pronged rotor, wherein the cleaner strippers reach in between the transport prongs at the rotor shaft arranged in rows, wherein densification elements can be swiveled between the transport prongs placed in rows against a device generating a closure force from below through slots in the rotor trough wherein the device generating the closure force induces the adjustable as high as possible densification degree by narrowing of the transport slots between the transport prongs. The thereby obtainable high and uniform densification and compacting of the silage material results in a high filling degree of the silage foil and a good fermentation.

The particularly effective transport and uniform densification and compacting are obtained by having the transport prongs of the pronged rotor worked in as a plurality at the circumference, five or six at one pronged disk and wherein these pronged disks are attached on a rotor shaft at distances from each other. The employed densification work is rendered uniform and the densification is thereby directed also toward the outside based on the staggering, since the pronged disks toward the edge and opposite to the from below toward the top directed direction of rotation in the tamping chamber are arranged staggered in numerous part steps, which part steps overall result into a quarter rotation.

In each case a compacting element is disposed between neighboring pronged disks of the pronged rotor in order to achieve a high permanent densification and compacting, wherein the compacting element independently of neighboring compacting elements is supported at a distance behind the pronged rotor at a parallel aligned axis swivelable between a position wherein the compacting element ends with the rotor trough and a position wherein the compacting element reaches from below to the rotor shaft, whereby a wide compacting region is covered.

In order to enable the uniform densification and compaction, for each densification and compacting element there is attached a spring element, wherein the spring element is constructed as a spring packet, at a spring support supported swivelable parallel to the axis of the compacting element, wherein the spring support is hingedly connected through a lever arm and is controllable through the densification pressure.

A simplification of the arrangement without disadvantage for the densification and compaction of the silage material is accomplished by application of spring bars as densification and compaction elements, wherein the densification and compaction elements are led to the rotor shaft slightly curved between with the transport prongs in the same way as the stiff densification and compaction elements and wherein the densification and compaction elements freely end and the densification and compaction elements are tensioned side-by-side at the other end at a support beam. The support beam is connected with a lever arm as described in connection with the spring elements, wherein a hydraulic control cylinder engages at the lever arm, wherein the hydraulics control cylinder is supported at the machine frame and wherein the hydraulic control cylinder furnishes the swiveling out and the closing. A densification and compaction adapted to the fodder volume is also achieved with this arrangement by the spring force of the densification and compaction element itself, wherein the degree of the maximum densification possibility is adjustable with the aid of the hydraulic control cylinder.

The throughput power is improved with the uniform charging of the pronged rotor and the densification and compaction can be adjusted simultaneously and at a high value. A worm trough is placed above and behind the rotor trough for this purpose, wherein a distributing worm is aligned parallel to the pronged rotor in the immediate neighborhood to the pronged rotor and wherein the distributing worm rotates for better transfer in an opposite sense of rotation relative to the pronged rotor, wherein the distributing worm circulates transporting from the middle on the two sides toward the edge, wherein from above the first slope conveyor of the charging device throws down the silage material.

The second slope conveyor of the charging device is furnished on the sides with board walls and exhibits a larger width as compared to the first slope conveyor in order to generate a sufficiently large storage chamber. The second slope conveyor transfers onto the first slope conveyor and the two slope conveyors are formed as scraper floor conveyors because of the robust and low interference construction kind.

The wall of the second slope conveyor is terminated by a metering device at the transfer point of the first slope conveyor for an adjustable limitation of the loading height of silage material, wherein the metering device comprises a hydraulically height adjustable and controllable vertical chain conveyor, whereby the feeding to the pronged rotor is rendered more uniform and therewith the filling of the silage foil is effected.

The width of the second slope conveyor is substantially wider in front of the metering device, that is prior to the transfer onto the first slope conveyor for the production of a large storage chamber as compared with and as corresponds to the width of the first slope conveyor and the width of the second slope conveyor is there led together to the width of the first slope conveyor and the second slope conveyor is furnished in the corners in the front with vertical removal worms for a better transfer.

The silage foil is together with the silage foil roller supported in the region above the first slope conveyor at a right angle relative to the longitudinal direction of the tamping machine at roller supports in order to obtain a sufficient withdrawal path and wherein the silage foil is led opposite to the tamping direction through a lower deflection roller, disposed about at half height of the guide wall, in the tamping direction upwardly and below and is led to the guiding wall uniformly pulled apart on the sides, in order that a pull tension as uniform as possible operates onto all parts of the silage foil; depending on the kind of the foil employed it is also possible to employ two different silage foil rolls and wherein two silage foil rolls are supported on the roller supports.

The installation of swivelably adjustable roller supports disposed on two sides under the tamping wall with guide rollers pairwise supported at the roller supports is furnished for the laying down of the silage foil below the tamping wall.

A hydraulic or electric drive of the two guide rollers is in each case advantageous for avoiding of feeding interferences and for the uniform feeding of the silage foil under the tamping wall, wherein a free wheel transmission coupled to the drive of the machine results in a further improvement. The application of metal tires with profile, in particular with tips, in each case at the two guide rollers results in a substantially improved gripping during advance, without that the perforations generated in the concerned region under the silo would bring a disadvantage on the floor.

The present Invention is in the following described by way of the drawing of an embodiment of the inventive arrangement.

BRIEF DESCRIPTION OF THE SEVERAL VIEWS OF THE DRAWING(S)

Figure 2:
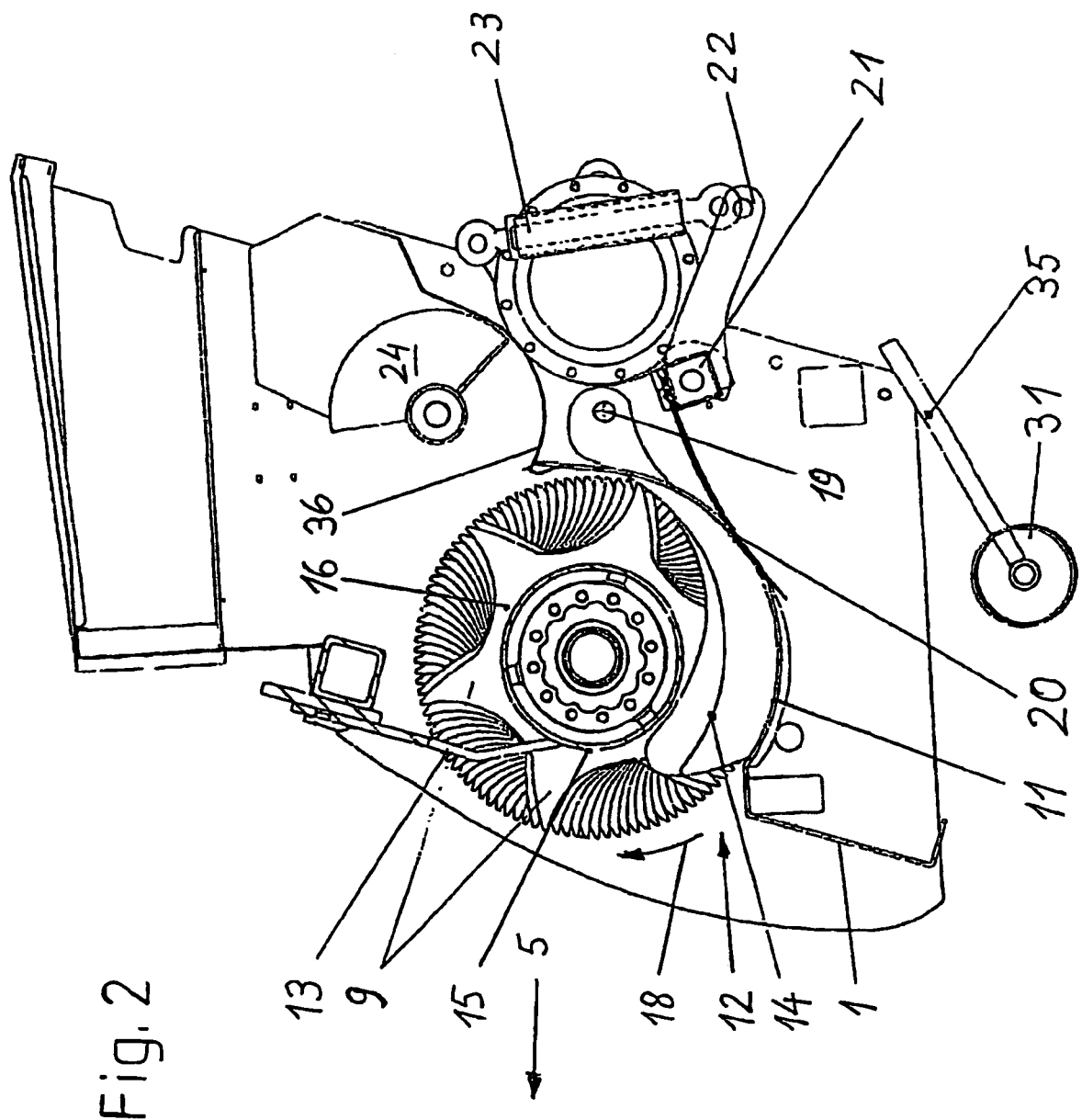
Figure 3:
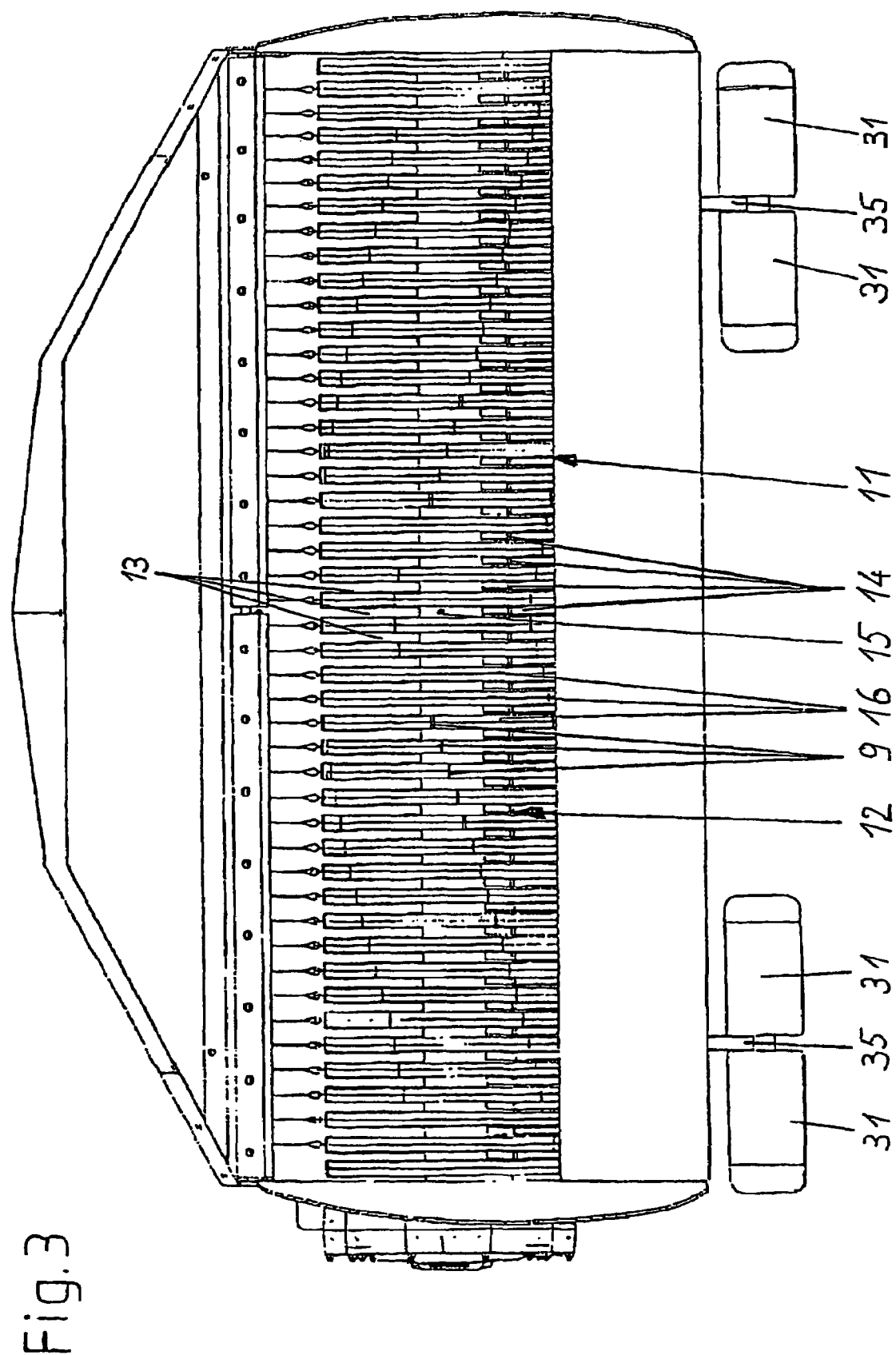
Figure 4:
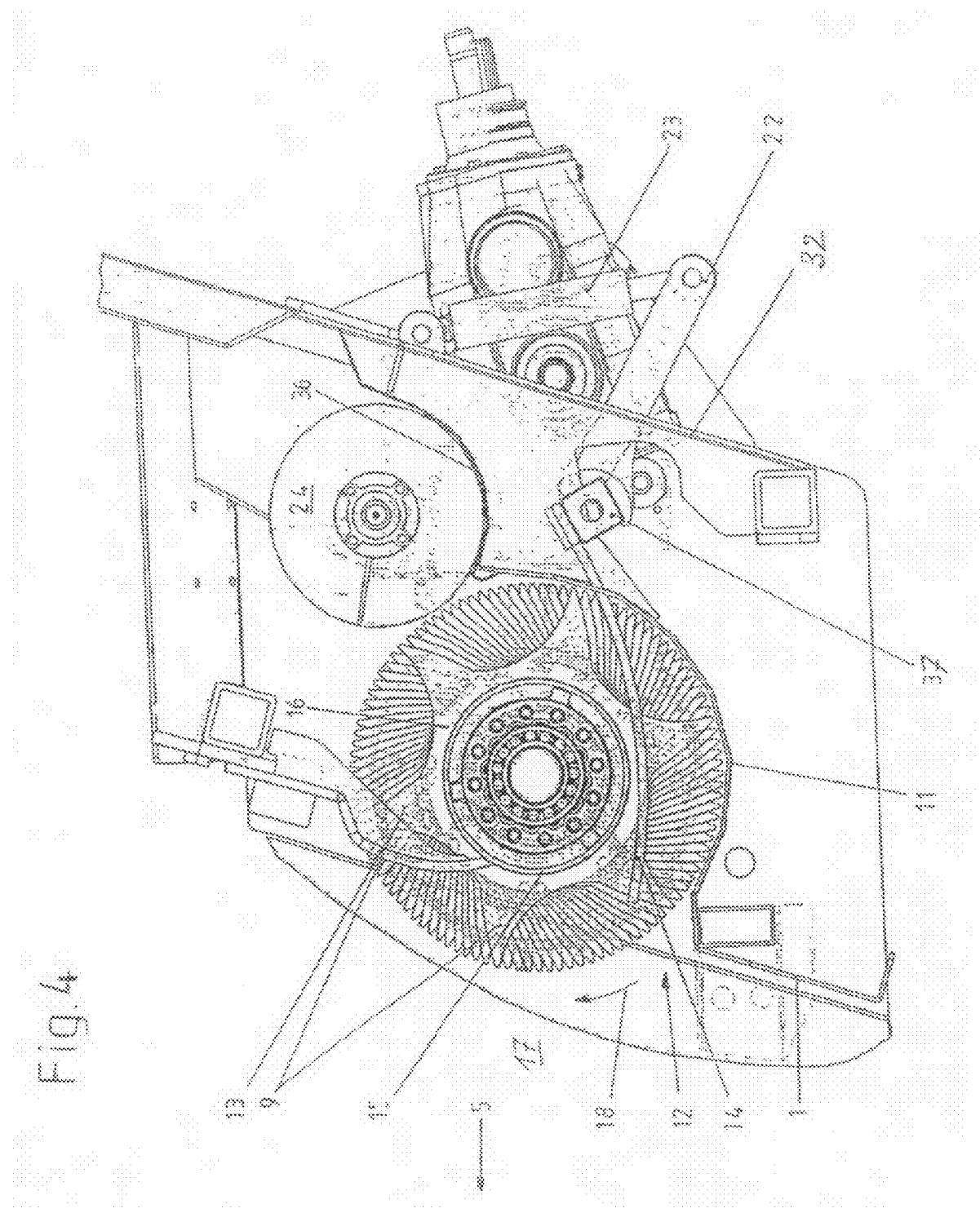

There is shown:

FIG. 1 a schematic, longitudinal sectional view of the tamping machine with the driving tractor;

FIG. 2 a partial sectional view of the longitudinal section of the tamping machine in FIG. 1 with the tamping device, schematically;

FIG. 3 a front view of the tamping machine according to FIG. 1 as seen on the working side of the tamping wall, with the pronged rotor and the deflection rollers for the foil, schematically;

FIG. 4 a partial section of the longitudinal section of the tamping machine as shown in FIG. 1, with the different compaction elements, schematically.

DETAILED DESCRIPTION OF THE INVENTION

The wheeled tamping machine or stuffing machine for the production of silage enclosed in silage foil and stored on the floor, wherein the silage essentially comprises preferably chopped blade materials and leaf materials and is supported on a machine frame 32 with a moving gear 33 and the moving gear for a second slope conveyor 26 of a charging device 4, the tamping wall 1 directed perpendicular to the tamping direction 5 of the silage material, wherein a pronged rotor 3 is supported in a rotor trough 11 horizontally and at a right angle relative to the longitudinal direction 10 of the tamping machine and wherein pronged rotor with the transport prongs 9 grips through a tamping opening 12 into the tamping chamber 17, a distributing worm 24 parallel predisposed to the pronged rotor 3 in the flow of materials and the charging device 4 with a first slope conveyor 25, with the second slope for conveyor 26 throwing down onto the first slope conveyor 25 and with a metering device 6 disposed between the first slope conveyor 25 and the second slope conveyor 26.

The pronged rotor 3 comprises pronged disks 16, wherein in each case six transport prongs 9 uniformly distributed are incorporated into the pronged disks 16 and which pronged disks are attached at the rotor shaft 15 at a distance corresponding to approximately the thickness of the pronged disks 16, wherein the rotor shaft 15 with the transport prongs 9 starting at the middle of the pronged rotor 3 are to the edge step-by-step staggered against the direction of rotation 18 directed from below to the top in the tamping chamber 17, wherein the staggering overall amounts to a quarter rotation.

Densification elements or compacting elements 14 reach through the rotor trough 11 between the transport prongs 9 and the pronged disks 16 and are independent from each other swivelable supported at an axis 19 disposed behind the pronged rotor 3 between a swiveled out position wherein the compacting elements 14 close our with the rotor trough 11 and the swiveled in position where the compacting elements 14 reach up to the rotor shaft 15. Each compacting element 14 is held pressed against the rotor shaft 15 by a spring element 20, wherein the spring element 20 is formed as a spring packet with several springs of increasing length, whereby the pressure is exerted onto the silage material transported by the pronged rotor 3.

The spring elements 20 are attached at a spring support 21 disposed parallel to the axis 18 and disposed pivotable below the axis 18.

The spring support 21 is furnished with a lever arm 22, wherein a hydraulic control cylinder 23 engages at the lever arm 22, wherein the hydraulic control cylinder 23 is supported at the machine frame 32 and wherein the pressure force for the silage material can be adjusted through the hydraulic control cylinder 23.

Densification elements or compacting elements 14 are attached and set closed at the support beam 37 and are formed as spring bars according to FIG. 4 instead of the spring support 21 with otherwise the same construction of lever arm and hydraulic control cylinder and the compacting elements 14 are led up to the neighborhood at the rotary drum.

Cleaner strippers 13 attached at a support reach on the side of the tamping wall 1 down between the transport prongs 9 up to the rotor shaft 15.

A worm trough 36 is placed in a high disposed extension of the rotor trough 11 immediately behind the pronged rotor 3, wherein the distributing worm 24 transportingly circulates in the worm trough 36 downwardly into the pronged rotor 3, wherein the first slope conveyor 25 delivers the silage material about the distributing worm 24.

The first slope conveyor 25 is charged by a second slope conveyor 26 of the charging device 4, wherein the second. slope conveyor 26 exhibits a substantially larger width for increasing of the storage volume and wherein the second slope conveyor 26 for the purpose involved is furnished with down flippable board walls also intended for increasing the storage volume.

The board walls close up with a wall against the first slope conveyor 25, wherein a vertically disposed chain conveyor 27 is employed in the wall, wherein the vertical chain conveyor 27 is installed adjustable for setting of the charging height in guidings with a hydraulic cylinder, in particular a controlled hydraulic cylinder, at a distance to the first slope conveyor 25.

The tools slope conveyors 25,26 and the vertical chain conveyor 27 are constructed as scraping floor chain conveyors.

The silage foil 30 is folded together to a silage foil roll 7 supported on a roller support 29 of the machine frame 32 of the tamping machine at a right angle to the longitudinal direction 10 above the first slope conveyor 25 or in case of employment of a combination of two silage foils, there are two silage foil rolls supported there.

The silage foil 30 is led over a deflection roller 8 disposed deeper, approximately at the height level of the middle of the tamping wall 1 and further away from the tamping wall 1, wherein the support of the deflection roller 8 is hydraulically adjustable in the longitudinal direction of the tamping machine and wherein the silage foil uniformly above on the sides and down toward the tamping wall 1 and over guide wall 2 is guided by the deflection roller 8, wherein the guide wall 2 surrounds the tamping wall 1 in the tamping direction 5 on top and on the sides reaching up to the lower under edge of the tamping wall 1, wherein the lower edge of the tamping wall 1 runs straight and essentially parallel to the floor.

The silage foil 30 pulled through below the lower edge of the tamping wall 1 is laid down on the floor with or without gaps between the parts of the silage foil 30 and is held sealingly pressed onto the floor by the silage material.

Foil roller supports 35 are adjustably installed in the lower region of the tamping wall 1 for rendering uniform the withdrawal of the silage foil 30, wherein pairwise guide rollers 31 are supported in each case at the foil roller supports 35 for the silage foil 30 running downwardly.

LIST OF REFERENCE CHARACTERS 1 tamping wall of the tamping machine
2 guide wall of the tamping machine
3 pronged rotor
4 feeding device
5 tamping direction of the tamping machine
6 metering device of the feeding device
7 silage foil roller
8 deflection roller for the silage foil 30
9 transport prongs of the pronged rotor 3
10 longitudinal direction of the tamping machine
11 rotor trough of the pronged rotor 3
12 tamping opening in the tamping wall 1
13 cleaner stripper of the transport prongs 9
14 compacting element of the pronged rotor 3
15 rotor shaft of the pronged rotor 3
16 pronged disk of the transport prongs 9
17 tamping chamber
18 direction of rotation of the pronged rotor 3
19 axis of the compacting elements 14 of the pronged rotor 3
20 spring element for the compacting elements 14
21 spring support for the spring element 20
22 lever arm of the spring support 21
23 hydraulic adjustment cylinder of the spring support 21
24 distributor worm
25 first slope conveyor of the feeder device 4
26 second slope conveyor of the feeder device 4
27 vertical chain conveyor of the metering device 6
28 removing worm of the feeding device 4
29 roller support of the silage foil roll 7
30 silage foil
31 guide roller for the silage foil 30
32 machine frame of the tamping machine
33 moving gear of the machine frame 32
34 moving gear of the second slope conveyor 26 of the feeding device 4
35 roller support of the guide rollers 31
36 worm trough of the distributor worm 24
37 support beam of the compacting elements 14

The invention claimed is:

1. A wheeled tamping machine for the production of floor supported silage for filling of a foil tube, comprising a tamping wall (1), wherein the tamping wall (1) is disposed perpendicular to a longitudinal direction (10) of the tamping machine and to a tamping direction (5), a guide wall (2) in the tamping direction (5) connects to the tamping wall (1) in upward direction and side ways, a driven compacting worm is disposed at the tamping wall (1), wherein the compacting worm is furnished at a right angle relative to the longitudinal direction (10) of the tamping machine, wherein the compacting worm is furnished as a pronged rotor (3) with helically staggered transport prongs (9), a feeding device (4) with a metering device (6) is predisposed to the compacting worm, a silage foil roller disposed above and supported by the feeding device, wherein silage foil (30) is led from the silage foil roller (7) over at least a deflection roller (8) to the guide wall (2), characterized in that the pronged rotor (3) is disposed in a rotor trough (11) with the transport prongs (9) and gripping through a tamping opening (12) in the tamping wall (1), cleaner strippers (13) disposed between the transport prongs (9) disposed in rows, the cleaner stripper reach from above to a rotor shaft (15) of the prong rotor, and densification and compacting elements (14) protrude between the row wise disposed transport prongs (9) from below through slots in the rotor trough (11) and wherein the densification and compacting elements (14) are pivotable against a device generating a force for closing, each of two sides of a lower region of the tamping wall having a pivotal adjustable roller support (35) attached thereto, each of the roller supports having a pair of guide rollers (31) connected thereto, wherein the silage foil is pulled under the tamping wall (1) over onto the guide rollers.

2. The wheeled tamping machine according to claim 1, characterized in that the transport prongs (9) of the pronged rotor (3) are furnished in a plurality, in particular five or six for each one of pronged disks (16) of the prong rotor at a respective circumference, wherein the transport prongs (9) are attached at distances from each other, wherein the pronged disks (16) are disposed staggered in partial steps from the middle of the pronged rotor (3) to an edge against a rotation direction (18) directed from below toward the top in a tamping chamber (17), wherein part steps result overall into a quarter rotation.

3. The wheeled tamping machine according to claim 1, characterized in that each of the densification and compacting elements (14) is disposed in each case between pronged disks (16) of the pronged rotor (3), wherein each of the densification and compacting elements (14) is independently supported behind the pronged rotor (3) at an axis (19) disposed parallel and swiveled between a position wherein such densification and compacting element (14) terminates with the rotor trough (11) and a position wherein such densification and compacting element (14) reaches from below to the rotor shaft (15).

4. The wheeled tamping machine according to claim 1, characterized in that a spring element (20), built up as a spring packet, is attached at a spring support (21) pivotal supported parallel to an axis (19) of the densification and compacting elements (14), wherein the spring support (21) is hingedly connected with a hydraulic adjustment cylinder (23) through a lever arm (22).

5. The wheeled tamping machine according to claim 1, characterized in that a worm trough (36) joins above and behind the rotor trough (11), wherein a distributing worm (24) is aligned parallel to the pronged rotor (3) in the worm trough (36), circulating in immediate neighborhood to the pronged rotor (3) in a sense of rotation in the distributing worm (24) from the middle on both sides towards an edge transporting and wherein a first slope conveyor (25) of the feeding device (4) throws off the silage material from above of the distributing worm (24).

6. The wheeled tamping machine according to claim 1, further comprises a second slope conveyor (26) of the feeding device (4) is furnished on a side with boards walls (27) and with a larger width for forming of a storage chamber, wherein the second slope conveyor (26) transfers silage material to a first slope conveyor (25) and wherein the two slope conveyors are formed as scraper floor chain conveyors.

7. The wheeled tamping machine according to claim 1, characterized in that a wall of a second slope conveyor (26) of the feeding device is terminated by the metering device (6) at a transition point onto a first slope conveyor (25) of the feeding device, wherein the metering device (6) comprises a hydraulically height level adjustable and controllable vertical chain conveyor (27) for limiting the loading height of the first slope conveyor (25).

8. The wheeled tamping machine according to claim 1, characterized in that a wall of a second slope conveyor (26) of the feeding device is led together to the width of a first slope conveyor (25) of the feeding device prior to transferring the silage material and wherein the second slope conveyor (26) is furnished with vertically disposed removing worms (28).

9. The wheeled tamping machine according to claim 1, characterized in that the silage foil roller (7) is supported at roller supports (29) in the region above a first slope conveyor (25) of the feeding device at a right angle to the longitudinal direction (10) of the tamping machine and wherein the silage foil (30) is in the tamping direction (5) upwardly, downwardly and sideways uniformly pulled apart against the tamping direction (5) through the deflection roller (8) located about at half height level of the guide wall (2) and wherein the silage foil (30) is led to the guide wall (2).

10. The wheeled tamping machine according to claim 1, characterized in that the densification and compacting elements (14), which engage between the row wise installed transport prongs (9) of the pronged rotor (3), are formed as spring bars, wherein the spring bars are tensioned at a support beam (37), wherein the support beam (37) is hingedly connected to a hydraulic adjustment cylinder (23) through a lever arm (22).

11. The wheeled tamping machine according to claim 1, wherein the guide rollers are furnished with metal profile tires, wherein the metal profile tires are covered by protruding tips.

12. A wheeled tamping machine for the production of floor supported silage for filling of a foil tube, comprising
a tamping wall (1) disposed perpendicular to a longitudinal direction (10) of the tamping machine and to a tamping direction (5);
a tamping opening (12) disposed in the tamping wall (1);
a guide wall (2) in the tamping direction (5) connecting to the tamping wall (1) in upward direction and side ways;
a driven compacting worm disposed at the tamping wall (1), wherein the compacting worm is furnished at a right angle relative to the longitudinal direction (10) of the tamping machine, wherein the compacting worm is furnished as a pronged rotor (3) with helically staggered transport prongs (9) disposed in rows;
a feeding device (4) with a metering device (6) predisposed to the compacting worm;

a silage foil roller (7) disposed above and supported by the feeding device (4);

a deflection roller (8), wherein silage foil (30) is led from the silage foil roller (7) over the deflection roller (8) to the guide wall (2);

a rotor trough (11) having slots, wherein the pronged rotor (3) with the transport prongs (9) is disposed in the rotor trough (11) and gripping through the tamping opening (12) in the tamping wall (1);

cleaner strippers (13) disposed between the transport prongs (9) and reaching from above to a rotor shaft (15);

densification and compacting elements (14) protruding between the row wise disposed transport prongs (9) from below through the slots in the rotor trough (11) for obtaining a high and uniform densification and compacting of silage material and wherein the densification and compacting elements (14) are pivotal against a device generating a force for closing.

13. The wheeled tamping machine according to claim 12 characterized in that the transport prongs (9) of the pronged rotor (3) are furnished in a plurality for each one of pronged disks (16) of the prong rotor at a respective circumference, wherein the transport prongs (9) are attached at distances from each other, wherein the pronged disks (16) are disposed staggered in partial steps from the middle of the pronged rotor (3) to a edge against a rotation direction (18) directed from below toward the top in a tamping chamber (17).

14. The wheeled tamping machine according to claim 12, wherein each of the densification and compacting elements (14) is disposed in each case between pronged disks (16) of the pronged rotor (3), wherein each of the densification and compacting elements (14) is independently supported behind the pronged rotor (3) at an axis (19) disposed parallel and swivelable between a position wherein such densification and compacting element (14) terminates with the rotor trough (11) and a position wherein such densification and compacting element (14) reaches from below to the rotor shaft (15).

15. The wheeled tamping machine according to claim 12, further comprising a spring element (20) attached at a spring support (21) pivotably supported parallel to an axis (19) of the densification and compacting elements (14), wherein the spring support (21) is hingedly connected with a mechanical actuator (23) through a lever arm (22).

16. The wheeled tamping machine according to claim 12 further comprising a worm trough (36) joining above and behind the rotor trough (11), wherein a distributing worm (24) is aligned parallel to the pronged rotor (3) in the worm trough (36), and wherein a first slope conveyor (25) of the feeding device (4) throws off the silage material from above of the distributing worm (24).

17. The wheeled tamping machine according to claim 12 further comprising a second slope conveyor (26) of the feeding device (4) is furnished on a side with boards walls (27) and with a larger width for forming of a storage chamber, wherein the second slope conveyor (26) transfers silage material to a first slope conveyor (25).

18. The wheeled tamping machine according to claim 12, wherein the silage foil (30) is pulled under the tamping wall (1) over onto side disposed pairwise guide rollers (31) supported on two sides below by pivotably adjustable roller supports (35) in each case.

19. The wheeled tamping machine according to claim 12, further comprising guide rollers (31) supported pivotal at swivelable adjustable roller supports (35), disposed in each case pair wise according to height level below the tamping wall (1) and driven hydraulically or electrically and furnished with metal profile tires.

\* \* \* \* \*